United States Patent [19]

Muthiah et al.

[11] Patent Number: 5,684,067
[45] Date of Patent: Nov. 4, 1997

[54] LOW GLOSS POLYESTER COATING POWDER COMPOSITIONS

[75] Inventors: Jeno Muthiah, Shillington; E. Susanne Deibert, Reading, both of Pa.

[73] Assignee: Morton International, Inc., Chicago, Ill.

[21] Appl. No.: 590,977

[22] Filed: Jan. 24, 1996

[51] Int. Cl.$^6$ ............................................. C08L 67/02
[52] U.S. Cl. ...................... 523/453; 523/465; 525/111; 525/934
[58] Field of Search ................................ 525/111, 934; 523/453, 465

[56] References Cited

U.S. PATENT DOCUMENTS

| | | | |
|---|---|---|---|
| 3,919,350 | 11/1975 | Iwasaua et al. | 260/850 |
| 3,954,901 | 5/1976 | Watanabe et al. | 260/850 |
| 4,189,421 | 2/1980 | Shay et al. | 260/38 |
| 4,352,924 | 10/1982 | Wooten et al. | 528/302 |
| 4,379,895 | 4/1983 | Frerking et al. | 525/437 |
| 4,442,270 | 4/1984 | Passmore et al. | 525/440 |
| 4,614,674 | 9/1986 | Lauterbach | 427/386 |
| 4,910,287 | 3/1990 | McLafferty et al. | 528/272 |
| 5,321,100 | 6/1994 | Belder et al. | 525/438 |
| 5,326,832 | 7/1994 | Belder et al. | 525/438 |
| 5,344,883 | 9/1994 | Loar | 525/176 |

FOREIGN PATENT DOCUMENTS 0389926  10/1990  European Pat. Off. ...... C08G 63/123

*Primary Examiner*—Patricia A. Short
*Attorney, Agent, or Firm*—Wayne E. Nacker; Gerald K. White

[57] ABSTRACT

Low gloss in a coating derived from a polyester/triglycidyl isocyanurate coating powder is achieved by including in the coating powder 2–10 phr ethylene acrylic acid copolymer, 0.2–1.0 phr of a compound selected from 2-mercapto benzothiazole, metal salts of 2-mercapto benzothiazole, such as zinc 2-mercapto benzothiazole, and up to 10 phr polyolefin wax.

3 Claims, No Drawings

LOW GLOSS POLYESTER COATING POWDER COMPOSITIONS

The present invention is directed to polyester coating powder compositions, particularly those polyester powder coating compositions cured with triglycidyl isocyanurate (TGIC), formulated to have low gloss.

BACKGROUND OF THE INVENTION

A well-known type of coating powder is based on acid-functional polyester resin and TGIC as a curative. Such a coating powder is found, for example, in U.S. Pat. Nos. 5,321,100, 5,326,832, 4,379,895 and 4,379,895, the teachings of each of which are incorporated herein by reference. Polyester coating powders are particularly advantageous in some outdoor applications, such as coating lawn furniture or window frames, because polyester coatings exhibit good UV-stability.

Coatings formed from polyester coating powder compositions tend to have relatively high gloss. For reasons of aesthetic preference, it would be desirable to have coating powders which provide low gloss. Gloss reduction of polyester coating powders has been attempted previously, the approaches generally being adding high levels of pigments and/or waxes. 60° Gardner Haze-Gloss units approaching 25 have been achieved by such high loading methods. However, higher amounts of filler and/or wax result in unacceptable blocking of the powder and/or orange peel of the coating, limiting the amount of gloss reduction which might be attained.

SUMMARY OF THE INVENTION

In accordance with the invention, in a polyester/TGIC coating powder, 60° Gardner Haze-Gloss unit levels of 25 or below, preferably 20 or below and most preferably 15 or below are achieved by including in the composition between about 2 and about 10 phr of a copolymer of ethylene and acrylic and/or methacrylic acid, between about 0.2 and about 1.0 phr of a compound selected from 2-mercapto benzothiazole, metal salts of 2-mercapto benzothiazole, and mixtures thereof. The coating powder preferably contains up to 10 phr, preferably between about 2 and about 10 phr, polyolefin wax.

DETAILED DESCRIPTION OF CERTAIN PREFERRED EMBODIMENTS

Herein, unless otherwise noted, the resin of the coating powder is considered to be the polyester and TGIC. Levels of other components are given as parts per hundred resin, by weight (phr). Percentages, unless otherwise noted, are weight percentages.

In coating powders of this type, the polyester is typically present at between about 90 and about 95 wt % of the total of polyester plus TGIC; and TGIC is present at between about 5 and about 10 wt % of the total of polyester plus TGIC.

Polyesters of the type generally used in coating powders are useful in the practice of the present invention. Molecular weights (number average) ($M_n$) of the polyesters generally range from about 2000 to about 7000, preferably between about 3000 and about 3500. Acid numbers typically range between about 30 and between about 60, preferably between about 30 and about 35. Glass transition temperatures are typically in the range of between about 40° C and about 80° C. To be curable by TGIC, the polyesters have acid functionalities of at least 2, up to about 3.5, but preferably in the range of between about 2.1 and about 2.5.

Polyesters are formed in conventional manner from carboxylic acids (or their anhydrides) having acid functionalities of 2 or greater and polyols having hydroxyl functionality of 2 or greater. Examples of suitable multi-functional carboxylic acids include benzene-1,2,4-tricarboxylic acid, phthalic acid, tetrahydraphthalic acid, hexahydrophthalic acid, endobicyclo-2,2,1-5-heptyne-2,3-dicarboxylic acid, tetrachlorophthalic acid, cyclohexanedioic acid, succinic acid, isophthalic acid, terephthalic acid, azelaic acid, maleic acid, trimesic acid, 3,6-dichlorophthalic acid, tetrachlorophthalic acid, adipic acid, sebacic acid, and like carboxylic acids, Examples of suitable multi-functional alcohols include glycerin, trimethylolpropane, trimethylolethane, trishydroxyethylisocyanurate, pentaerythritol, ethylene glycol, diethylene glycol, propylene glycol, trimethylene glycol, 1,3-, 1,2- and 1,4-butanediols, heptanediol, hexanediol, octanediol, 2,2-'bis (4-cyclohexanol) propane, neopentyl glycol, 2,2,3-trimethylpentane-1,3-diol, 1,4-dimethylolcyclohexane, 2,2,4-trimethylpentane diol, etc. To obtain carboxyl-functional polyesters of desired molecular weight, the monomer mixture used to form the polyester has an appropriate excess of carboxyl functionality to hydroxyl functionality.

The copolymer used in the present invention as one of the gloss reducing agents is formed of between about 80 and about 95 wt % ethylene monomer and between about 5 and about 20 wt % acrylic acid and/or methacrylic acid, preferably acrylic acid. The melt index ($MI_2$) as measured by ASTM D-1238 is between about 10 and about 30, preferably in the range of about 20.

2-mercapto benzothiazole and metal salts are presently used for vulcanizing rubber. Examples of suitable compounds for use in the present invention include, but are not limited to zinc 2-mercapto benzothiazole, 2-mercapto benzothiazole and mixtures thereof. Zinc 2-mercapto benzothiazole is the currently preferred additive.

The polyolefin waxes are substantially saturated aliphatic hydrocarbons (alkanes). Polyolefin waxes useful in the invention include paraffins derived from petroleum and low molecular weight, e.g., less than 10,000, polyethylenes. For use in the present invention, the polyolefin wax should have a melting point of between about 90° C and about 120° C.

Optionally, the coating powder may include a cure catalyst, such as methyl triphenyl phosphonium bromide (MTPB), tetra n-butyl phosphonium bromide (TPB), di-butyltin oxide, and tetrabutyl titanate.

The coating composition may be filled or unfilled. Filling is possible up to about 50 to 60 phr with fillers and pigments such as carbon black, titanium dioxide, silica, etc.

The thermosetting resin coating particulates are produced in the usual manner. The components are blended, and then are melt-compounded with heating above the melting point of the resin for a short time, e.g., 30–90 sec., so that no significant curing occurs. The molten compound is extruded, and after extrusion, the composition is rapidly cooled. The composition is then ground and, as necessary, the particulates sorted according to size. For electrostatic coating application, the particulates are generally in the 5–100 micron size range with a major portion generally being in the 20–40 micron size range. Larger particulates are useful for fluidized bed coating operations.

The invention will now be described in greater detail by way of specific examples.

EXAMPLES 1–15

A slow reacting (A) and a fast reacting (B) carboxylic acid terminated polyester were prepared from the following monomer mixes and had the following properties

| Monomer | A (wt %) | B (wt %) |
|---|---|---|
| Neopentyl glycol | 27.57 | 35.30 |
| Trimethylol propane | 1.19 | |
| Terephthalic acid | 65.09 | 52.72 |
| Isophthalic acid | 6.15 | 7.78 |
| Adipic acid | | 3.22 |
| Ethylene aglycol | | 0.68 |
| Ethyl triphenyl phosphonium bromide (cure catalyst) | | 0.20 |

The polyester had the following specific properties

| | A | B |
|---|---|---|
| Acid number | 33 | 33 |
| Molecular weight (number average) | 3300 | 4200 |
| Glass transition temperature (°C.) | 53 | 60 |

Sample preparation involved blending the carboxyl terminated polyester resin or resins, TGIC (curing agent), flow additives, pigments and the waxes in the amounts shown in tables 1 & 2. The sample was then extruded at 200° F. to facilitate melt blending. The extruded material was mixed with dry flow additive and then ground into powder. The powder (particles less than 105 microns in size) was electrostatically sprayed onto a grounded Q-panel. The panel was cured in an oven at 400° F. for 10 minutes. Gel time and hot plate melt flow were tested on the powder and direct impact, pencil hardness, flexibility, MEK resistance and gloss were tested on panels with a coating thickness of 1.8–2.2 mils. The properties for the samples given in Tables 1, 3, 5, and 7 are listed in Tables 2, 4, 6, and 8.

TABLE 1

SAMPLES IN PARTS PER HUNDRED (PHR) OF DIFFERENT EXPERIMENTS

| SAMPLE NUMBER | #1 | #2 | #3 |
|---|---|---|---|
| Slow Reacting Carboxylic Acid Terminated Polyester | 46.5 | 46.5 | 46.5 |
| Fast Reacting Carboxylic Acid Terminated Polyester | 46.5 | 46.5 | 46.5 |
| TGIC | 7.0 | 7.0 | 7.0 |
| Flow Additives | 2.2 | 2.2 | 2.2 |
| $TiO_2$ | 40 | 40 | 40 |
| Carbon Black | 0 | 0 | 0 |
| EAA Copolymer[A] | 0 | 0 | 8 |
| Polyolefin Wax with zinc 2-mercapto benzothiazole[B] | 0 | 8 | 0 |

[A] - Acrylic Acid Content 10 wt %
[B] - DT 3329 from Ciba Geigy Corporation

TABLE 2

PROPERTIES OF SAMPLES DESCRIBED IN TABLE 1

| SAMPLE NUMBER | #1 | #2 | #3 |
|---|---|---|---|
| Gel Time (secs) | 132 | 62 | 125 |
| HPMF* (mm) | 80 | 63 | 70 |
| Direct Impact (in-lbs) | 160 | 160 | 160 |
| Pencil Hardness (mar/scourge) | H/2H | H/2H | H/2H |
| Flexibility (3/16" rod) | Pass | Pass | pass |
| MEK Resistance | 5 | 4–5 | 5 |
| Gloss (20°/60°) | 81/95 | 5/24 | 6/42 |

*hot plate melt flow

Sample #1 is a sample without any wax and 40 phr of $TiO_2$. The coating from this sample resulted in a high 60° gloss of 95. When 8 phr of each of DT 3329 and EAA copolymer was added in two different samples (#2 and #3) the gloss achieved was 24 and 42, respectively. In all the three samples described in Table 1, it was attempted to use the reactivity difference between two resins to reduce the gloss. Without addition of wax no significant reduction in gloss was noticed.

TABLE 3

SAMPLES OF DIFFERENT EXPERIMENTS

| SAMPLE NUMBER | #4 | #5 | #6 |
|---|---|---|---|
| Slow Cure Carboxylic Acid Terminated Polyester | 46.5 | 0 | 46.5 |
| Fast Cure Carboxylic Acid Terminated Polyester | 46.5 | 93.0 | 46.5 |
| TGIC | 7.0 | 7.0 | 7.0 |
| Flow Additives | 2.2 | 2.2 | 2.2 |
| $TiO_2$ | 40 | 40 | 0 |
| Carbon Black | 0 | 0 | 2 |
| EAA Copolymer[A] | 4 | 4 | 2 |
| Polyolefin Wax with zinc 2-mercapto benzothiazole[B] | 4 | 4 | 4 |

[A] - Acrylic acid content 10 wt %
[B] - DT 3329 from Ciba Geigy Corporation

TABLE 4

PROPERTIES OF SAMPLES DESCRIBED IN TABLE 3

| SAMPLE NUMBER | #4 | #5 | #6 |
|---|---|---|---|
| Gel Time (secs) | 75 | 75 | 120 |
| HPMF (mm) | 65 | 60 | 73 |
| Direct Impact (in-lbs) | 160 | 160 | 160 |
| Pencil Hardness (mar/scourge) | H/2H | H/2H | H/2H |
| Flexibility (3/16" rod) | Pass | Pass | Pass |
| MEK Resistance | 4 | 4 | 4 |
| Gloss (20°/60 °) | 0/15 | 0/15 | 5/27 |

In sample #4, 4 phr of each DT 3329 and EAA copolymer was used and synergistically the gloss dropped to 15 units. This is well below the gloss achieved with 8 phr of the individual waxes (sample #2 and #3). This gloss level was achieved even in the absence of slow reacting carboxyl polyester (sample #5). Sample #6 has reduced amounts of the waxes (2 phr of EAA copolymer and 4 phr of DT 3329) and the gloss increased to 27.

TABLE 5

SAMPLES OF DIFFERENT EXPERIMENTS

| SAMPLE NUMBER | #7 | #8 | #9 |
|---|---|---|---|
| Slow Cure Carboxylic Acid Terminated Polyester | 46.5 | 46.5 | 46.5 |

TABLE 5-continued

SAMPLES OF DIFFERENT EXPERIMENTS

| SAMPLE NUMBER | #7 | #8 | #9 |
|---|---|---|---|
| Fast Cure Carboxylic Acid Terminated Polyester | 46.5 | 46.5 | 46.5 |
| TGIC | 7 | 7 | 7 |
| Flow Additives | 2.2 | 2.2 | 2.2 |
| $TiO_2$ | 40 | 40 | 40 |
| Carbon Black | 0 | 0 | 0 |
| Ethylene-Acrylic Acid Copolymer | 4 | 7 | 4 |
| Polyolefin Wax with zinc 2-mercapto benzothiazole | 8 | 8 | 4 |
| Barium Sulfate | 0 | 0 | 60 |

TABLE 6

PROPERTIES OF SAMPLES DESCRIBED IN TABLE 5

| SAMPLE NUMBER | #7 | #8 | #9 |
|---|---|---|---|
| Gel Time (secs) | 70 | 64 | 106 |
| HPMF (mm) | 57 | 71 | 30 |
| Direct Impact (in-lbs) | 160 | 160 | 120 |
| Pencil Hardness (mar/scourge) | F/H | F/H | F/H |
| Flexibility (3/16" rod) | Pass | Pass | Fail |
| MEK Resistance | 4-5 | 4 | 5 |
| Gloss (20°/60 °) | 0/13 | 0/11 | 0/14 |

In samples #7 and #8 by increasing the amounts of the waxes, the gloss was reduced between 13 and 11 units without sacrificing any properties. In sample (#9), 4 phr each of DT 3329 and EAA copolymer was combined with 60 phr of barium sulfate and the HPMF was reduced drastically without any reduction in gloss.

TABLE 7

SAMPLES OF DIFFERENT EXPERIMENTS

| SAMPLE NUMBER | #10 | #11 | 232-93-5 |
|---|---|---|---|
| Slow Cure Carboxylic Acid Terminated Polyester | 46.5 | 46.5 | 46.5 |
| Fast Cure Carboxylic Acid Terminated Polyester | 46.5 | 46.5 | 46.5 |
| TGIC | 7 | 7 | 7 |
| Flow Additives | 2.2 | 2.2 | 2.2 |
| $TiO_2$ | 0 | 0 | 0 |
| Carbon Black | 2 | 2 | 2 |
| Ethylene-Acrylic Acid Copolymer | 0 | 4 | 4 |
| Polyolefin Wax with zinc 2-mercapto benzothiazole | 0 | 4 | 4 |
| Barium Sulfate | 0 | 0 | 60 |

TABLE 8

PROPERTIES OF SAMPLES DESCRIBED IN TABLE 5

| SAMPLE NUMBER | #10 | #11 | #12 |
|---|---|---|---|
| Gel Time (secs) | 134 | 51 | 52 |
| HPMF (mm) | 118 | 121 | 57 |
| Direct Impact (in-lbs) | 160 | 160 | 160 |

TABLE 8-continued

PROPERTIES OF SAMPLES DESCRIBED IN TABLE 5

| SAMPLE NUMBER | #10 | #11 | #12 |
|---|---|---|---|
| Pencil Hardness (mar/scourge) | B/F | F/H | HB/F |
| Flexibility (3/16" rod) | Pass | Pass | Pass |
| MEK Resistance | 4 | 5 | 4-5 |
| Gloss (20°/60 °) | 88/95 | 5/22 | 0/16 |

Samples described in Tables 7 and 8 contain 2 phr of carbon black instead of 40 phr $TiO_2$ as pigments. Without any wax the gloss achieved was 95 units. Sample #11 containing 4 parts each of DT 3329 and EAA copolymer resulted in gloss of 22 units. This is higher than what was achieved in formulations containing $TiO_2$. This is due to increased HPMF when 40 phr of $TiO_2$ was replaced with 2 phr of carbon black. In sample #12 the HPMF was reduced by the addition of 60 phr of barium sulfate and the gloss was reduced to 16.

Table 9 shows formulations with EAA copolymer and polyolefin wax without zinc 2-mercapto benzothiazole (#13) and EAA copolymer and zinc 2-mercapto benzothiazole (#14). Lower gloss that resulted from the synergy between DT 3329 and EAA copolymer (#15) could not be achieved.

TABLE 9

SAMPLES AND GLOSS LEVELS

| Notebook NUMBER | #13 | #14 | #15 |
|---|---|---|---|
| EAA Copolymer | 4 | 4 | 6.4 |
| DT 3329 | 4 | | |
| Polyolefin Wax | | 4 | |
| Zinc 2-mercapto benzothiazole | | | 1.6 |
| Gloss (60°) | 14 | 45 | 45 |

What is claimed is:

1. In a coating powder composition comprising a polyester resin and triglycidyl isocyanurate, the improvement wherein said coating powder composition further comprises between about 2 and about 10 parts per hundred resin by weight of a copolymer of ethylene and acrylic acid said copolymer consisting essentially of between about 80 and about 95 wt % ethylene and between about 5 and about 20 wt % acrylic acid; plus between about 0.2 and about 1.0 parts per hundred resin by weight of a compound selected from the group consisting of 2-mercapto benzothiazole, metal salts of 2-mercapto benzothiazole, and mixtures thereof; plus between about 2 and about 10 parts per hundred resin by weight polyolefin wax, said coating powder composition being fusable and curable to provide a coating having a 60 ° Gardner Haze-Gloss unit level of 25 or below.

2. A coating powder composition according to claim 1 wherein said compound is zinc 2-mercapto benzothiazole.

3. The coating powder composition according to claim 1 wherein said ethylene/acrylic acid copolymer has a melt index ($MI_2$) as measured by ASTM D-1238 of between about 10 and about 30.

* * * * *

UNITED STATES PATENT AND TRADEMARK OFFICE
CERTIFICATE OF CORRECTION

PATENT NO. : 5,684,067
DATED : November 4, 1997
INVENTOR(S) : Muthiah et al.

It is certified that error appears in the above-indentified patent and that said Letters Patent is hereby corrected as shown below:

Col. 5, Ln. 57, correct
"Properties of Samples Described in Table 5" to read
-- Properties of Samples Described in Table 7 -- .

Signed and Sealed this

Tenth Day of March, 1998

*Attest:*

BRUCE LEHMAN

*Attesting Officer*    Commissioner of Patents and Trademarks